US012579671B2

(12) United States Patent
Wu et al.

(10) Patent No.: US 12,579,671 B2
(45) Date of Patent: Mar. 17, 2026

(54) MINIATURIZED PHASE CALIBRATION APPARATUS FOR TIME-OF-FLIGHT DEPTH CAMERA

(71) Applicant: Analog Devices, Inc., Wilmington, MA (US)

(72) Inventors: Tzu-Yu Wu, Wayland, MA (US); Charles Mathy, Arlington, MA (US)

(73) Assignee: Analog Devices, Inc., Wilmington, MA (US)

( * ) Notice: Subject to any disclaimer, the term of this patent is extended or adjusted under 35 U.S.C. 154(b) by 323 days.

(21) Appl. No.: 18/188,329

(22) Filed: Mar. 22, 2023

(65) Prior Publication Data

US 2023/0316554 A1     Oct. 5, 2023

Related U.S. Application Data

(60) Provisional application No. 63/325,342, filed on Mar. 30, 2022.

(51) Int. Cl.
*G06K 9/00*     (2022.01)
*G06T 7/586*     (2017.01)

(52) U.S. Cl.
CPC .................................... *G06T 7/586* (2017.01)

(58) Field of Classification Search
CPC ....... G06T 7/586; G01S 7/497; G01S 17/894; G01S 7/4814; G01S 7/4816; G01S 17/08; H04N 23/55; H04N 23/56
See application file for complete search history.

(56) References Cited

U.S. PATENT DOCUMENTS

| | | | | |
|---|---|---|---|---|
| 6,829,043 B2 * | 12/2004 | Lewis | .................. | G01S 7/4811 |
| | | | | 356/5.07 |
| 7,385,215 B2 * | 6/2008 | Fowler | .................... | B63J 99/00 |
| | | | | 250/559.19 |
| 7,936,449 B1 * | 5/2011 | Bamji | .................. | G01S 17/894 |
| | | | | 356/3.01 |
| 8,274,037 B2 * | 9/2012 | Ritter | .................... | G01N 21/55 |
| | | | | 250/214 R |

(Continued)

FOREIGN PATENT DOCUMENTS

| | | | | |
|---|---|---|---|---|
| CN | 105572681 A | * | 5/2016 | .......... G01S 17/894 |
| CN | 108267749 A | | 7/2018 | |

(Continued)

OTHER PUBLICATIONS

Office Action issued in Taiwanese Application No. 112111304, dated Sep. 30, 2024.

(Continued)

*Primary Examiner* — Shervin K Nakhjavan
(74) *Attorney, Agent, or Firm* — Knobbe, Martens, Olson & Bear, LLP

(57)     ABSTRACT

Systems and apparatus for phase calibration in time-of-flight cameras. In particular, systems and methods are presented for a miniaturized cover design that at least partially encloses the time-of-flight (ToF) module. The geometry of the miniaturized design causes the signals reflected from the calibration device back to the ToF imager to have essentially the same time-of-flight. The design of the calibration device prevents the modulated emissions from leaking out to the environment.

20 Claims, 12 Drawing Sheets

(56)                    References Cited

U.S. PATENT DOCUMENTS

|  |  |  |  |
|---|---|---|---|
| 8,482,722 B2 * | 7/2013 | Min | G01S 17/36 |
|  |  |  | 356/5.1 |
| 9,383,229 B2 * | 7/2016 | Chin | G01D 5/34715 |
| 9,588,224 B2 * | 3/2017 | Heng | G01S 7/4813 |
| 9,590,129 B2 * | 3/2017 | Deliwala | H10F 55/255 |
| 9,681,123 B2 * | 6/2017 | Perry | G01S 7/4915 |
| 11,196,982 B2 * | 12/2021 | Amaya-Benitez | G01S 17/02 |
| 11,423,572 B2 | 8/2022 | Mathy et al. |  |
| 11,500,100 B2 * | 11/2022 | Godbaz | G01S 17/86 |
| 11,627,298 B2 * | 4/2023 | Pacala | G01S 17/89 |
|  |  |  | 250/350 |
| 2012/0092485 A1 * | 4/2012 | Meinherz | G01S 7/4802 |
|  |  |  | 348/91 |
| 2014/0160459 A1 * | 6/2014 | Huber | G01S 7/4865 |
|  |  |  | 356/5.01 |
| 2015/0288955 A1 | 10/2015 | Perry et al. |  |
| 2018/0096489 A1 | 4/2018 | Cohen et al. |  |
| 2020/0137373 A1 * | 4/2020 | Iguchi | G01S 17/894 |
| 2022/0221332 A1 * | 7/2022 | Ho | G01J 1/0214 |
| 2022/0229183 A1 | 7/2022 | Chang et al. |  |
| 2024/0249408 A1 * | 7/2024 | Mitrea | A61B 5/0071 |
| 2024/0375617 A1 * | 11/2024 | Nichols | G06T 7/60 |

FOREIGN PATENT DOCUMENTS

|  |  |  |  |  |  |
|---|---|---|---|---|---|
| CN | 109782256 A | * | 5/2019 | | G06T 7/586 |
| CN | 114127582 A |  | 3/2022 |  |  |
| JP | 2005-172824 A |  | 6/2005 |  |  |
| KR | 20180064969 A |  | 6/2018 |  |  |
| KR | 20200138732 A |  | 12/2020 |  |  |
| TW | 202104926 A |  | 2/2021 |  |  |

OTHER PUBLICATIONS

Office Action issued in Korean Patent Application No. 2023-0040571, dated Jul. 22, 2025.
Office Action issued in Chinese Patent Application No. 202310316109.5, dated Jan. 29, 2026.

* cited by examiner

MINIATURIZED PHASE CALIBRATION APPARATUS FOR TIME-OF-FLIGHT DEPTH CAMERA

CROSS REFERENCE TO PRIORITY APPLICATION

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/325,342, filed Mar. 30, 2022 and titled "MINIATUR-IZED PHASE CALIBRATION APPARATUS FOR TIME OF FLIGHT DEPTH CAMERA," the disclosure of which is hereby incorporated by reference in its entirety and for all purposes.

FIELD OF THE DISCLOSURE

The present disclosure relates to time-of-flight cameras. More specifically, this disclosure describes apparatuses and systems for phase calibration in time-of-flight depth cameras.

SUMMARY OF THE DISCLOSURE

The innovations described in the claims each have several aspects, no single one of which is solely responsible for its desirable attributes. Without limiting the scope of the claims, some prominent features of this disclosure will now be briefly described.

Systems, methods, and apparatuses are presented herein for phase calibration in time-of-flight cameras. In particular, systems and methods are presented for a miniaturized (cover) design that at least partially encloses the time-of-flight (ToF) module. According to various examples, the geometry of the miniaturized design causes the signals reflected from the calibration device back to the ToF imager to have essentially the same time-of-flight. Additionally, the design of the calibration device prevents the modulated emissions from leaking out to the environment, and therefore the calibration device prevents any stray light from bouncing around the surroundings and then reflecting back to be received oy the imager. Furthermore, the calibration device allows multiple ToF modules to be calibrated in parallel in a tighter space without crosstalk (i.e. emission from one module to be received by another module).

One aspect of this disclosure is a system for time-of-flight calibration. The system includes a light source configured to emit a plurality of light signals, a reflector configured to reflect at least some of the plurality of light signals, and a pixel array configured to receive the at least some of the plurality of light signals reflected by the reflector. The at least some of the plurality of light signals travel a total distance including a respective first distance between the light source and the reflector and a respective second distance between the reflector and the pixel array. The total distance traveled by the at least some of the plurality of light signals is substantially equal.

The reflector can contain the plurality of light signals and prevent light signals from straying outside the system. The reflector can be an inner surface of half of a three-dimensional elliptical cover. For an elliptical cover, the light source and the pixel array can be located at or near foci of the elliptical cover. The reflector can be an inner surface of a half-sphere cover. For a half-sphere cover, the light source and the pixel array can be located near a center of the sphere.

The system can include a diffuser in a light path from the light source to the pixel array. The system can include an imaging lens positioned above the pixel array and a diffuser positioned above the imaging lens.

The system can include an optical attenuator in a light path from the light source to the pixel array. The optical attenuator can be stacked with a diffuser. The optical attenuator can be positioned between the light source and the reflector.

The system can include a first channel between the light source and the reflector and a second channel between the reflector and the pixel array. The first and second channels can induce side walls with materials, coatings, structures, or textures that absorb photons from the plurality of light signals that could otherwise have multiple reflections from the side walls if the light signals are not absorbed. The first channel can have a first length that is approximately equal to the respective first distance, and the second channel can have a second length that is approximately equal to the respective second distance. The system can include a waveguide to guide each of the plurality of light signals from the light source to the pixel array.

The total distance traveled by one of the plurality of light signals received by the pixel array is the sum of the first distance and the second distance, and is within 3 millimeters error of the total distance traveled by all other ones of the plurality of light signals received by the pixel array.

Another aspect of this disclosure is system for time-of-flight calibration. The system includes a light source configures to emit a plurality of light signals, a pixel array configured to receive at least some of the plurality of light signals, and a waveguide configured to guide the at least some of the plurality of light signals from the light source to the pixel array. Each of the at least some of the plurality of light signals travels a total distance. The total distance traveled by one of the at least some of the plurality of light signals is within 3 millimeters error of the total distance traveled by all other ones of the at least some of the plurality of light signals.

The waveguide can be an optical fiber.

Another aspect of this disclosure is method of time-of-flight calibration. The method includes emitting, from a light source of a time-of-flight module, a plurality of light signals; receiving, with a pixel array of the time-of-flight module, at least some of the plurality of the light signals, wherein each of the at least some of the plurality of light signals travels a substantially equal distance from the light source to the pixel array; and determining correction terms for phase delay associated with pixels of the pixel array based on the receiving.

The at least some of plurality of light signals can travel from the light source and get reflected by a reflector to the pixel array: where the reflector is an inner surface of a cover over light source and pixel array of the time-of-flight module. The cover can have a shape of half of a three-dimensional ellipse. The cover can have a shape of half of a three-dimensional sphere.

A waveguide can guide the at least some of the plurality of light signals from the light source to the pixel array.

The method can include applying the correction terms to calibrate the time-of-flight module.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

The drawings show exemplary calibration circuits and configurations. Variations of these circuits, for example, changing the positions of, adding, or removing certain elements from the circuits are not beyond the scope of the present invention. The illustrated calibration apparatuses, cameras, configurations, and complementary devices are intended to be complementary to the support found in the detailed description.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

For a fuller understanding of the nature and advantages of the present invention, reference is made to the following Detailed description of preferred embodiments and in connection with the accompanying drawings, in which.

DETAILED DESCRIPTION

Figure 1:
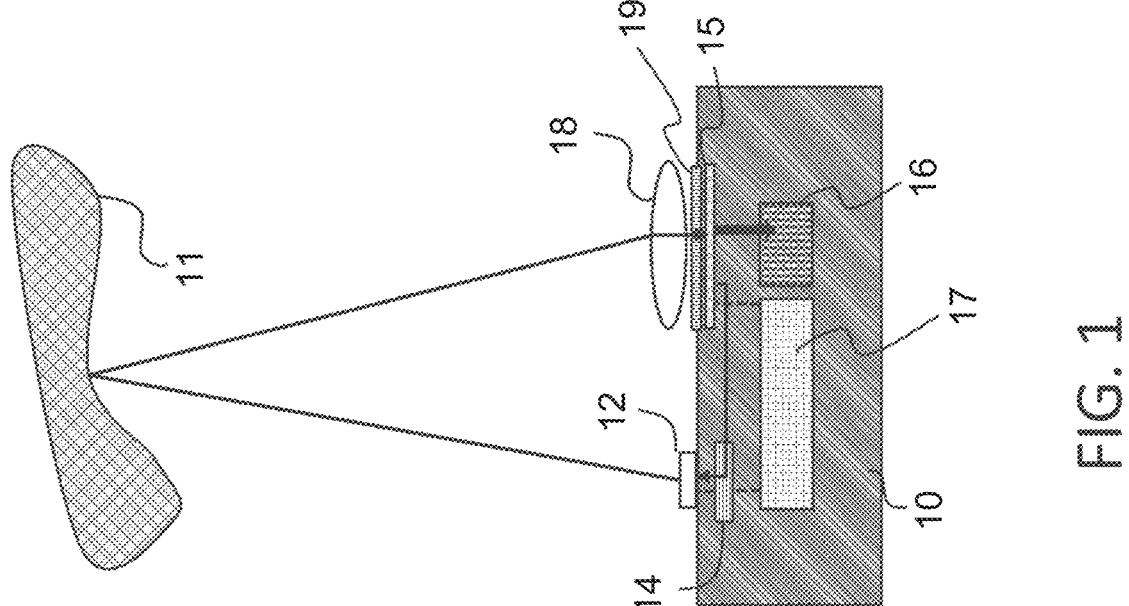
FIG. 1 depicts a time-of-flight (ToF) camera configured to image an object, according to various embodiments of the disclosure.

Systems, methods, and apparatuses are presented herein phase calibration in time-of-flight (ToF) cameras. In particular, systems and methods are presented for a miniaturized (cover) design that at least partially encloses the ToF module. According to various examples, the geometry of the miniaturized design causes the signals reflected from the calibration device back to the ToF imager to have essentially the same time-of-flight. Additionally, the design of the calibration device prevents the modulated emissions from leaking out to the environment, and therefore the calibration device prevents any stray light from bouncing around the surroundings and then reflecting back to be received by the imager. Furthermore, the calibration device allows multiple ToF modules to be calibrated in parallel in a tighter space without crosstalk.

In some ToF imagers, each pixel of a time-of-flight imaging array has its own initial phase offset due to various delays from both external and internal sources to the imaging array. This phase offset is calibrated for each pixel for the depth engine to provide an accurate depth measurement. One of the phase offset calibration concepts is to provide the pixels the signal, which corresponds to a known depth information to correct for the phase offsets of entire pixel array. Thus, it is the phase offset (or depth offset), which varies for each pixel in the imager array, that is to be calibrated Time-of-flight imagers are typically calibrates using a reflector (such as a mirror or a target panel in the form of a wall) at a known distance from the ToF camera and orthogonal to the optical axis Z of the camera to provide the imager array a uniform known phase. However, when the modulated fight is emitted into the scene within a certain field of illumination, the imager can receive not only the light reflected by the reflector, but also other light signals with different times of flight (i.e., phases) that are randomly reflected within the environment of the calibration setup. Since the phase received by the imager contains different unknown optical path lengths, this makes accurate calibration challenging. To reduce the influence of stray light to the measurement, every effort can be made to minimize stray light level, such as adding baffles and darkening the environment and often requires larger physical space for obtaining good signal to stray light ratio which increase the cost. Current phase calibration station enclosures based on this traditional approach are approximately 0.5 m×0.5 m×0.5 m or larger. Thus, the set-up is bulky. Additionally, there is a minimal distance (~0.3 m or longer) between the reflector and the module to ensure the uniform and unsaturated signal. This traditional system does not allow multiple ToF modules to be calibrated in parallel in a tight space due to possible interference between the modules.

Systems and methods are disclosed for a calibration system that enables accurate calibration of multiple time-of-flight imagers in a much smaller space. In particular, a miniaturized cover design is disclosed that at least partially encloses the ToF module. The geometry of the cover design ensures that substantially all the signals reflected back from the inner surface of the cover to the ToF imager have essentially the same time-of-flight. The light signals emitted from a light source to an imaging array via a reflection off of an inner surface of the cover can travel substantially the same distance such that outputs of pixels of the imaging array can be used for phase offset correction. For example, each of the light signals can travel a total distance that is within +1-3 millimeters error. One of the light signals received by the imaging array can travel a total distance from the light source to the imaging array that is within 3 millimeters error of the total distance traveled by each of the other light signals from the light source that are received by the imaging array. For instance, one light signal can travel 53 mm total distance and another light signal can travel 50 mm total distance and these two total distances can be considered substantially equal in the context of the calibration systems disclosed herein.

If the optical path lengths of the light signals from the emitter to the imaging array are not the same, then error can be introduced in the phase calibration. The more the variation in total distance traveler by different light signals, the more error can be introduced in the calibration. Accordingly, a goal is to provide every pixel of the pixel array the light signals that travel essentially the same distance (e.g., within +/−3 millimeters error) from the emitter to the imaging array such that each pixel receives the essentially the same phase for pixel initial phase calibration.

Additionally, the cover can prevent the modulated emission leaking out to the environment and can therefore prevent any stray light from bouncing around the surrounding and being received by the imager (or the imager of another system being calibrated nearby). Thus, the cover allows multiple ToF modules to be calibrated in parallel in a tight space without crosstalk. Crosstalk is the emission from one module being received by another module.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

FIG. 1 depicts a time-of-flight camera 10 configured to image an object 11, according to various embodiments of the disclosure. The ToF camera 10 of FIG. 1 includes a light source 12, a driver 14, an imaging array 15, a sensor processing module 16, and power management system 17. The ToF depth camera 10 may also induce other components such as an imaging lens 18, and a wavelength filter 19 in front of the imaging array 15. The ToF depth camera 10 can include a ToF module.

The light source 12 may include a modulated laser such as an infrared (IR) or near infrared (NIR) laser. The light source 12 can include one or more vertical cavity surface emitting laser (VCSELs) or edge-emitting laser diode (EELS) or high-power light emitting diodes (LEDs).

The driver 14 can be a laser driver that modulates the intensity of the light emitted by the light source 12 and a temporal optical waveform can be virtually any periodic shape including but not limited to rectangular, sinusoidal, or other shapes in between.

A ToF sensor includes an imaging array 15 of depth sensing pixels that receives the returning light from an object 11 and outputs values for each pixel. An imaging lens 18 focuses the returning light on the imaging array 15, and a wavelength filter 19 filters out light outside the bandwidth around the light source wavelength.

A processing algorithm converts output raw frames from the imaging array 15 into grayscale infrared images, depth images or point clouds.

ToF initial phase offset correction is described. Indirect time-of-flight (iToF) depth sensing technology utilizes modulated light emission and measures the phase difference between the sent and received signals. By knowing the modulation frequencies and the speed of light, the measured phase corresponds to the time-of-flight.

In some ToF imagers, each pixel of a time-of-flight imaging array has its own initial phase offset due to various delays from both external and internal sources to the imaging array. This phase offset is calibrated for each pixel for the depth engine to provide an accurate depth measurement. One of the phase offset calibration concepts is to provide the pixels the signal, which corresponds to a known depth information to correct for the phase offsets of entire pixel array. The correction term PO is expressed as:

$$P0 = \text{mod}\left(\frac{2\pi f(OPL)}{C} - \theta_{measured}, 2\pi\right)$$

where OPL is the optical path length of the light from the light source to the calibration refractor and reflected to the receiver, $\theta_{measured}$ is the phase extracted from the raw measurements, c is the speed of light, and f is the laser modulation frequency.

Systems and methods are disclosed herein for miniaturized phase calibration optical designs in which almost all the returned signals from the emitter (i.e., transmitter) of the ToF module to the imager's pixel array (i.e., receiver) have essentially the same time-of-flight. The returned signals can have the same or a sufficiently close ToF for implementing phase offset compensation within a design specification. The design covers both transmitter and receiver of the ToF module and makes the phase calibration mostly or completely immune from the environmental stray light including the ambient light or multipath transmit signal being bounced around the environment. The inner surface of the cover has elliptical shape or spherical shape. Other shapes of reflectors that cover both receiver and transmitter are also possible.

In some embodiments, the phase calibration design has the inner surface of the refractor as an ellipse. The design utilizes two fundamental properties of the ellipse that are advantageous to ToF imager phase calibration. In particular, any light ray leaving one focus (F1) should always focus onto another focus of ellipse (F2). FIG. 2A shows an example of an ellipse with light rays reflecting according to this principle, according to various embodiments of the disclosure. In FIG. 2A, light rays emitted from focus F1 are received at focus F2.

Figure 2B:
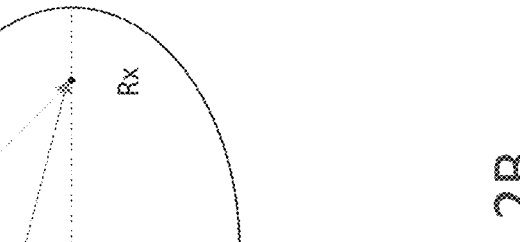
FIGS. 2A and 2B show example light ray paths, according to various embodiments of the disclosure.
Figure 2A:
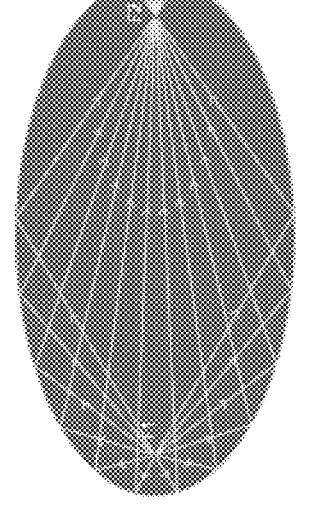

FIG. 2B shows examples of ray path lengths from one focus reflecting off the elliptical surface, and reaching to another focus, according to various embodiments of the disclosure. In particular, as shown in FIG. 2B, ray path lengths from one focus Tx reflecting off the elliptical surface and reaching to another focus Rx are constant. When light is emitted radially, all the reflected light from one focus Tx arrives at the other focus Rx at the same time, regardless the emitting angle.

Figure 3:
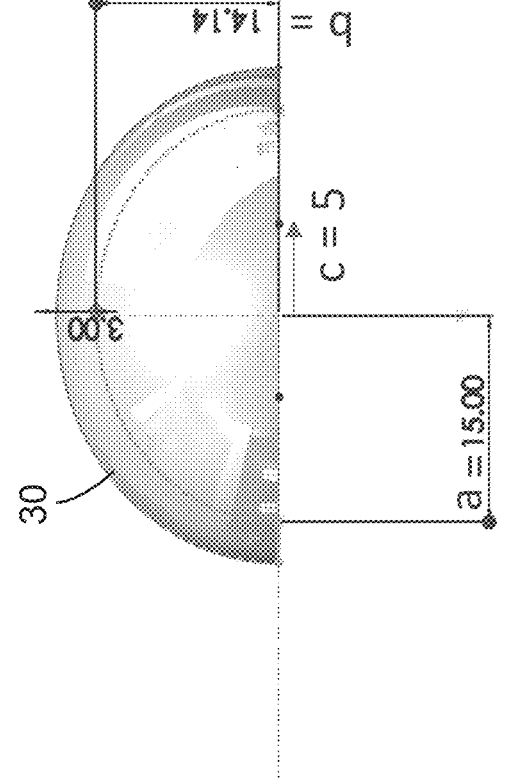
FIG. 3 illustrates an example ellipse geometry of the refractor, according to various embodiments of the disclosure.

FIG. 3 illustrates an example ellipse geometry of a refractor 30, according to various embodiments of the disclosure. In particular, an inner surface of the refractor 30 has an elliptical shape. The ellipse is resigned such that the emitter (Tx) and receiver (Rx) of TOF camera are located at or near the foci of the el ipse. The design is based on the ellipse equation where 2a is the length of the length of the major axis, 2b is the length of the minor axis, and c is focal length from the center which follows the equation of $c^2=a^2-b^2$ as shown in FIG. 3.

Figure 4B:
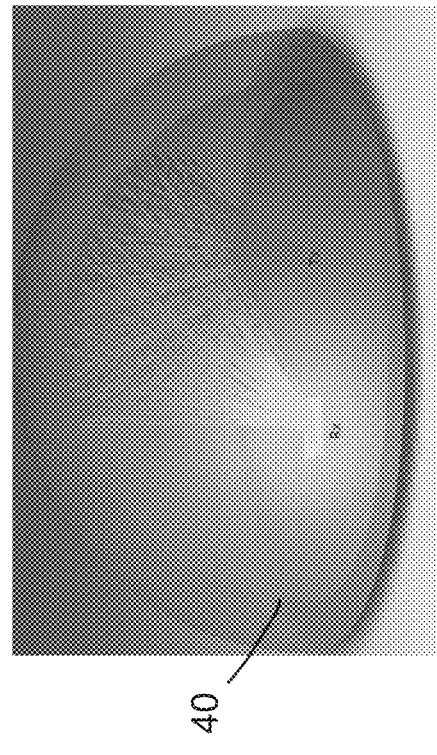
FIGS. 4A and 4B show ray trace simulation inside the elliptical refractor, according to various embodiments of the disclosure.
Figure 4A:
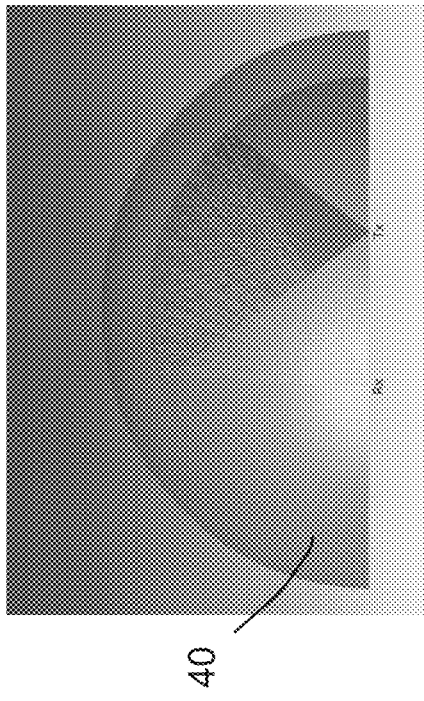

FIGS. 4A and 4B illustrate a ray trace simulation of the ToF light paths inside an elliptical reflector, according to various embodiments of the disclosure. FIGS. 4A and 4B show ray trace simulation examples in Zemax.

In this simulation, light emits from emitter Tx with a field of illumination (FOI) of 72×58 degrees. The emitter Tx is a point source or an extended source such as a vertical-cavity surface emitting laser (VCSEL), a VCSEL array, one or more edge emitters or laser diode, or a fiber coupled laser. The emitter Tx is located at or near one of the foci of the elliptical refractor.

The receiver Rx of the ToF module and is located at or near the other focus of the ellipse. The receiver includes an imaging lens assembly and a TOF imager. In some examples, a diffuser is en-route in the light path from the emitter Tx to the receiver Rx. In some examples, the diffuser is mounted right above the receiver imaging lens.

In some implementations, an optical attenuator is en-route in the light path from the emitter Tx to the receiver Rx. In some examples, the optical attenuator is stacked with the diffuser. In some examples, the optical attenuator is placed above the Tx light source. In some examples, the optical attenuator is paced right above the receiver Rx imaging lens.

The location of the emitter Tx and receiver Rx can be slightly off from the foci (i.e., defocused) of the ellipse in x, y and z directions. Light from the emitter Tx is reflected and/or scattered by the inner surface of the elliptical reflector towards the receiver Rx of the TOF module. The miniature reflector can be made using 3-dimensional (3D) printing, injection molding, computerized numerical control (CNC) machining or polishing. The inner surface of the reflector can be reflective and/or diffusive.

FIGS. 4A and 4B show ray trace simulations inside the elliptical refractor. In particular, FIG. 4A shows an emitter Tx simulated as point source. All of the rays leaving Tx point are focused on the other focus where receiver Rx is located. FIG. 4B shows an emitter Tx simulated as an extended light source with an area of 0.8 mm×0.8 mm. The receiver Rx is simulated to have a receiving area of 3.5×3.5 mm.

According to another aspect, a calibration assembly of the above embodiments is disclosed, wherein the calibration refractor can be mounted onto the TOF module like a cover.

Figure 5:
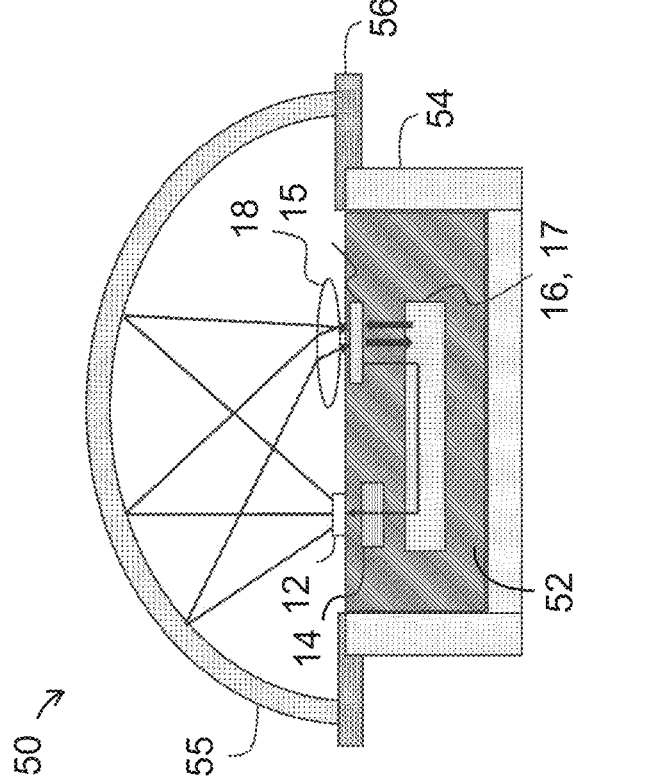
FIG. 5. shows aspects of an example calibration assembly for calibrating an imaging array of the ToF module, according to various embodiments of the disclosure.

FIG. 5 shows aspects of an example calibration assembly 50 for calibrating the ToF imager (i.e., an imaging array) of the ToF module 52, according to various embodiments of the disclosure. The calibration assembly 50 includes a module mechanical mount 54 to which the ToF module 52 is securely mounted. A miniatured calibration reflector 55 is mounted on the reflector mount 56, which is fixed on the module mechanical housing or mount 54. In some examples, the miniatured calibration reflector 55 is mounted directly on the module mechanical housing or mount 54. The miniatured calibration reflector 55 covers the ToF module 52 and is configured such that the light source 12 and ToF imager (e.g., imaging array 15) are located near the foci of the reflector 55. Modulated emission from the light source 12 are reflected and/or scattered from the reflector 55 and received by the ToF imager. The surface of the reflector 55 can be diffusive, reflective, or a mix of both. The reflector 55 and other reflectors disclosed herein can reflect at least partial light signals. In some instances, such reflectors can reflect substantially all light.

Figure 6:
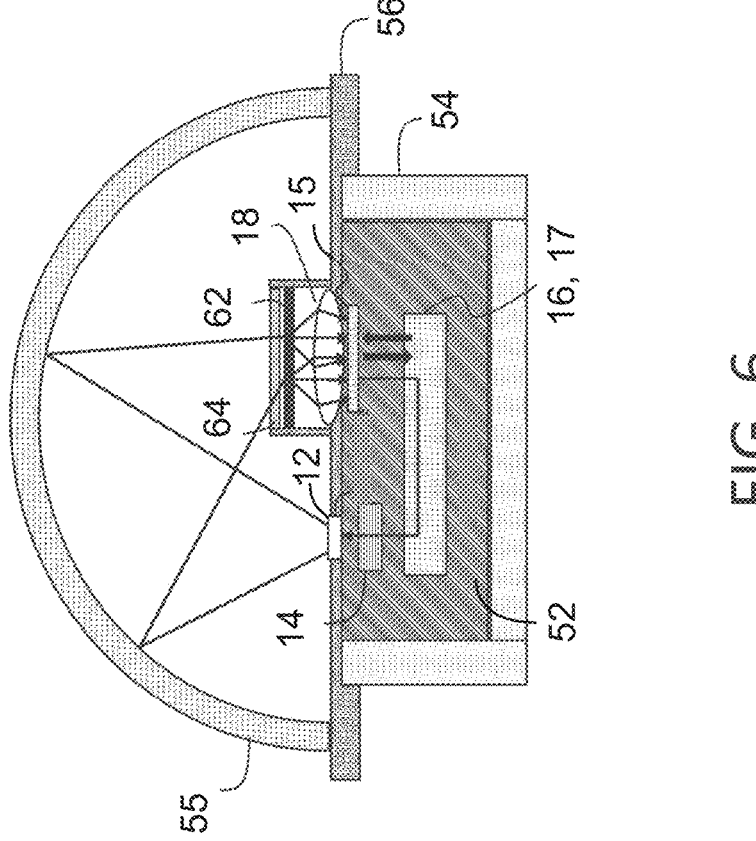
FIGS. 6 and 7 show a calibration cover design similar to that shown in FIG. 5, according to various embodiments of the disclosure.

FIG. 6 shows a calibration cover design similar to that shown in FIG. 5, according to various embodiments of the disclosure. In particular, as shown in FIG. 6 a diffuser 62 and a neutral density (ND) filter 64 are arranged en route to the light path from the light source 12 to the reflector 55 and to the ToF imager (e.g., imaging array 15). FIG. 6 shows that the diffuser 62 and ND filter 64 are stacked in front of the imaging lens 18.

Figure 7:
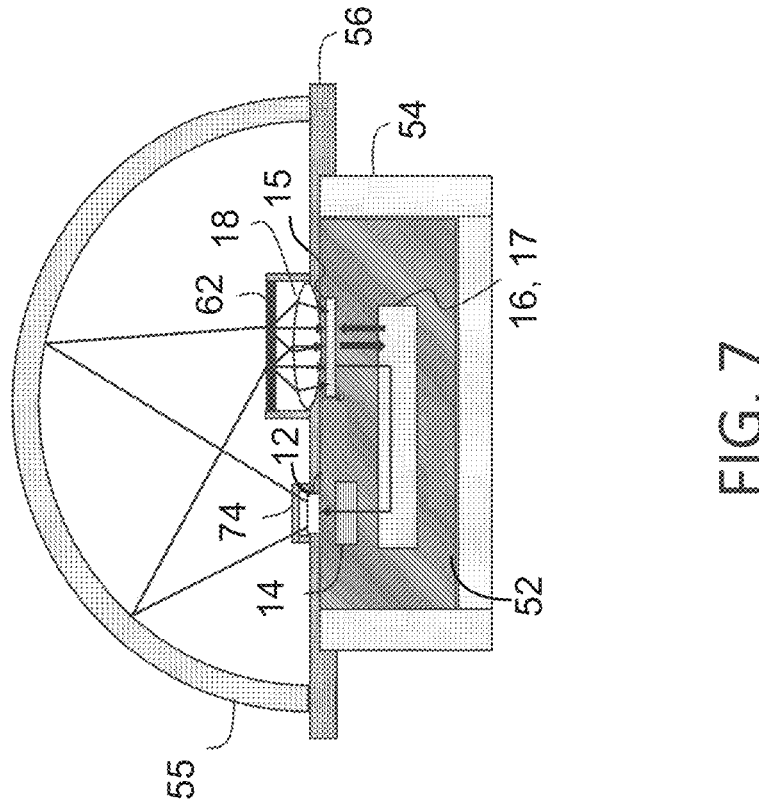

FIG. 7 shows another calibration cover design similar to those shown in FIGS. 5 and 6, according to various embodiments of the disclosure. In FIG. 7, an ND filter 74 is mounted in front of the light source 12 whereas the diffuser 62 is mounted right above the imaging lens 18. Virtually any type of structure may be used to support the reflector 55, ND filter 74, and diffuser 62.

In another implementation, the configuration is similar to that shown in FIG. 4 except that the inner surface of the reflector is spherical instead of elliptical. The mid-point between the emitter Tx and receiver Rx can be at or near the center of the sphere. The other descriptions of the embodiments described above are applicable to the embodiment in which the reflector has a spherical inner surface.

By the virtue of the designs, effectively all the light reaching the ToF imager (e.g., imaging array) during calibration travels essentially the same distance, and this distance is known. The output from each pixel can then be used as a correction term for the phase delay on the pixel such as to bring the output into agreement with an actual travel distance from the light source to the ToF imager. Such travel distance is approximately equal to the major axis length of the ellipse (e.g., 2*a in FIG. 3) or the diameter of the sphere in case the inner surface of the cover has spherical shape.

In some applications, it may be beneficial to have a cover with a shape other than the ones proposed above. In the elliptical and spherical embodiments, the sizes of the covers are determined by the distance between light source and imager and the shapes of the inner surface of the covers should follow the elliptical or spherical equation. Once the systems are covered, they can be placed in close proximity to each other, and each system may perform measurements simultaneously without disturbing each other's measurements, since each cover blocks the light of its respective system. To fit a set of covered systems in a temperature chamber for simultaneous temperature calibration measurements, other cover shapes that lead to a higher packing density may be desirable. The following embodiment examples could allow for smaller covers. One feature of covered calibration systems is that the majority of the photons going from a light source to the ToF imager traveled the same or similar distances. For example, we may desire that 99% of photons traveled a distance within 1 millimeter of each other, if the desired accuracy of calibration is within 1 millimeter.

Figure 8:
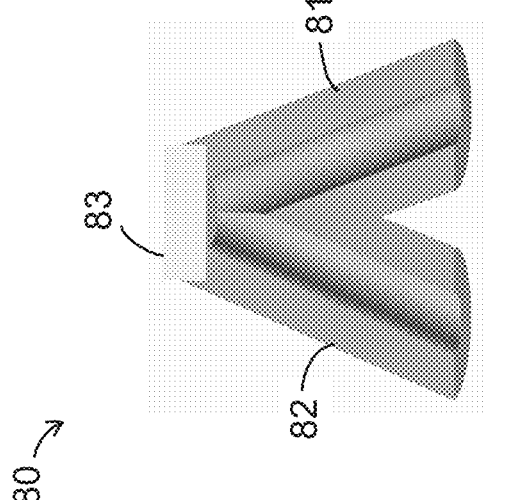
FIG. 8 shows an example of a calibration assembly made up of two cylinders, according to various embodiments of the disclosure.

FIG. 8 shows an example of a calibration assembly 80 made up of two cylinders 81 and 82, one in front of a light source, and one in front of the sensor, according to various embodiments of the disclosure. FIG. 8 shows a cross section of this embodiment. The inner surface of the cylinders 81 and 82 may be highly absorbent for the light corning out of the light source. Where the cylinders 81 and 82 meet, a highly reflective surface 83 may be positioned, which could be a strongly specular surface placed such that the photons hitting the mirrors travel directly to the sensor. The photons hitting the surface of the cylinders 81 and 82 could be mostly absorbed, and the majority of photons arriving at the sensor would be those that traveled directly to the highly reflective surface 83 and from there directly to the sensor. Such an assembly may benefit from elements in FIGS. 6 and 7, such as a neutral density filter and a focusing lens, and/or a diffuser.

Figure 9:
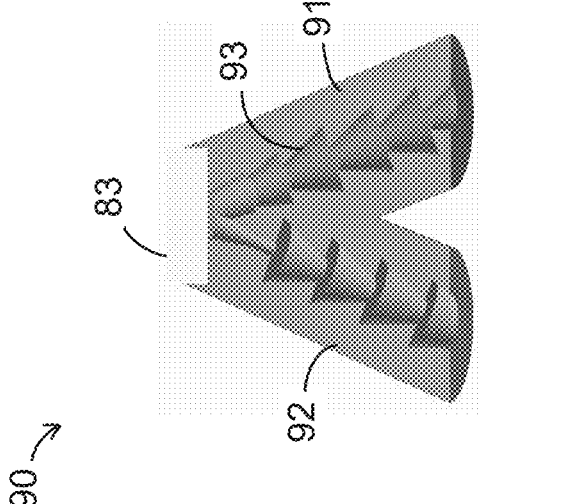
FIG. 9 shows another example of a calibration assembly made up of two cylinders, according to various embodiments of the disclosure.

FIG. 9 shows an example of a calibration assembly 90 made up of two cylinders 91 and 92, one in front of a light source, and one in front of the sensor, wherein the inner surfaces of the cylinders are populated with light traps 93, according to various embodiments of the disclosure. The configuration is similar to that in the embodiment in FIG. 8, except that for the inner surface light traps 93, which look like a sawtooth pattern from the side. FIG. 9 shows a cross section of this embodiment. When a photon hits such a sawtooth, it is more likely to bounce back towards the light source than to bounce forward, thus reducing the amount of photons that undergo bounces before arriving at the sensor. Neutral density filters may be placed on front of the light source and/or sensor and/or inside the sawtooth cylinders to reduce the amount of light not traveling straight to the reflective surface 83 and to the sensor. A diffuser may be placed in front of the receive imaging lens to create uniform illumination across the ToF imager.

Figure 10:
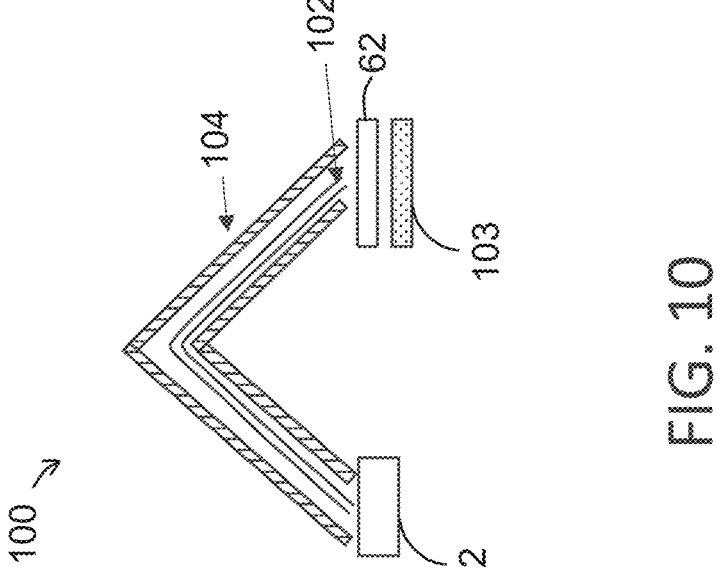
FIG. 10 shows an example of a calibration assembly including a waveguide placed inside the assembly guiding light from a light source to the imager, according to various embodiments of the disclosure.

FIG. 10 shows an example of a calibration assembly 100 including an optical fiber 102 or other type of waveguide that is placed inside the assembly guiding light from a light source 12 to the ToF imager (e.g., sensor 103), according to various embodiments of the disclosure. In some examples, the configuration is similar to that in the embodiment in FIG. 8 except that the optical fiber 102 (or waveguide in genera) is placed inside the assembly guiding light from a light source 12 to the sensor 103. The encasing 104 around the optical fiber 102 can be of any suitable shape, since all the photons entering the fiber can travel essentially the same distance.

Figure 11:
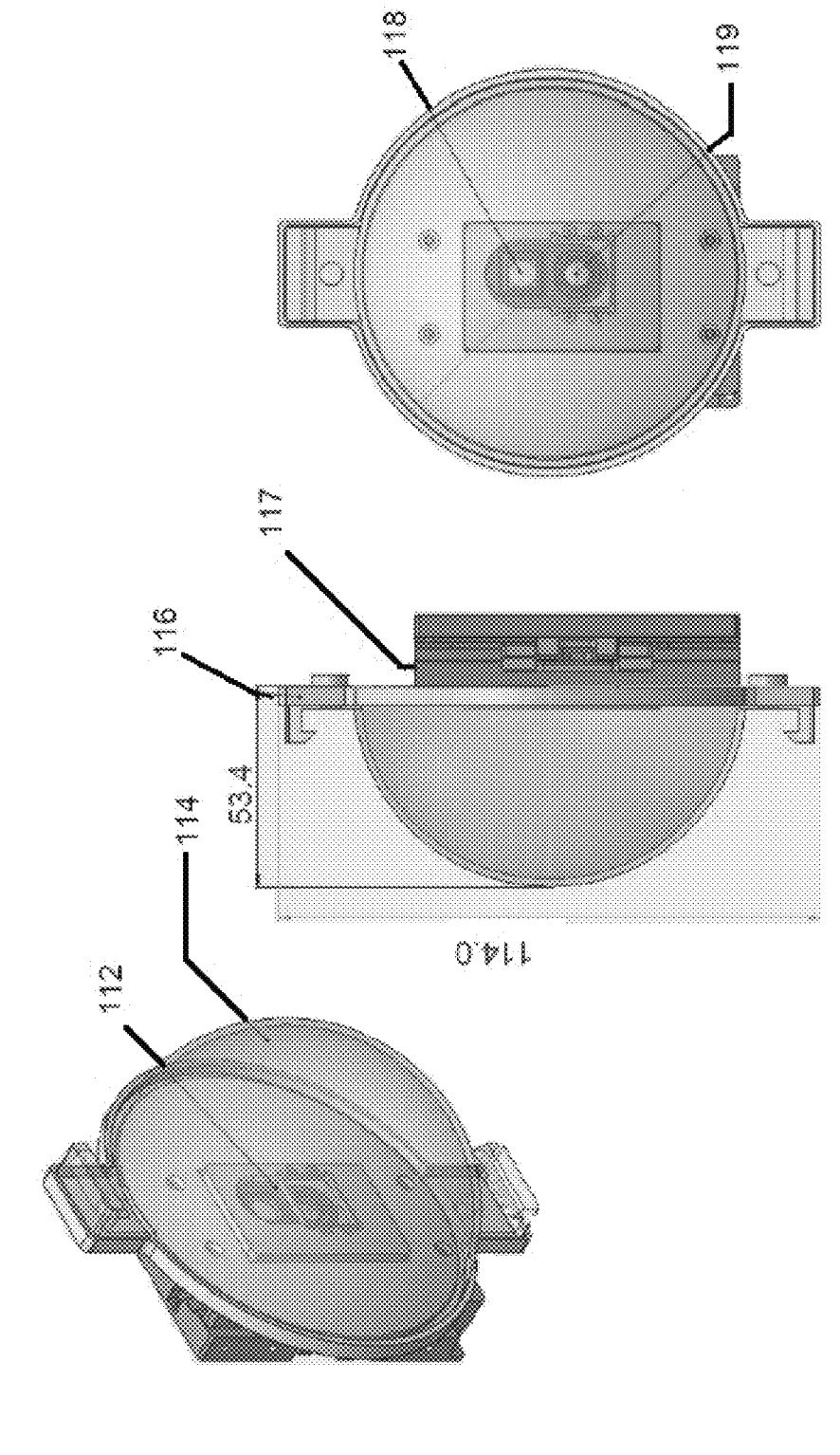
FIGS. 11 and 12 show phase offset calibration covers, according to various embodiments of the disclosure.
Figure 12:
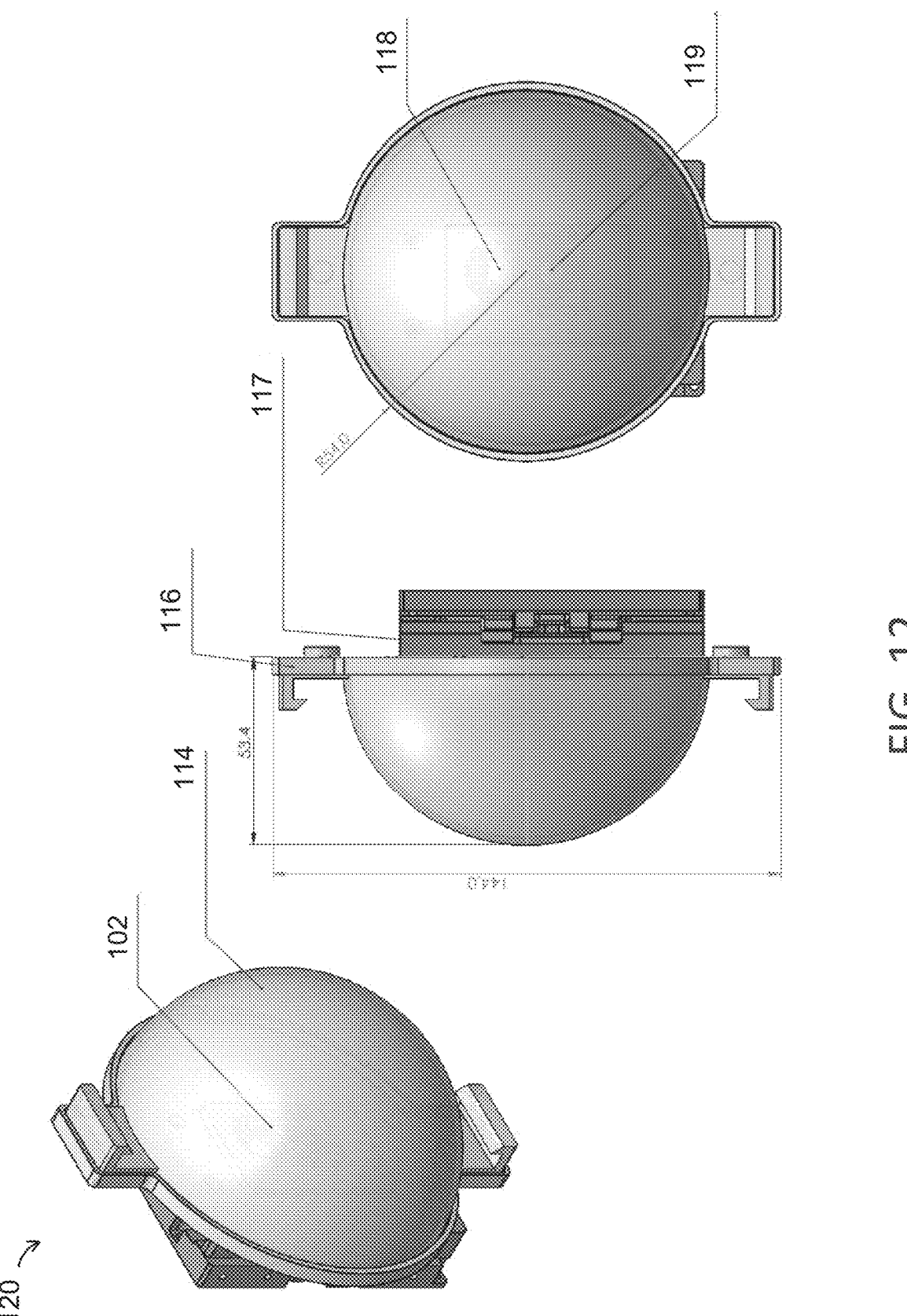

FIGS. 11 and 12 show phase offset calibration covers, according to various embodiments of the disclosure. FIG. 11 schematically illustrates a ToF camera 110 that includes a ToF module 112 and a phase correction cover 114. The phase correction cover 114 is secured to a cover mount 116. The ToF module 112 is secured to a mechanical mount 117 that includes electrical connections. The ToF module 112 includes an emitter 118 and a receiver 119 positioned such that light signals emitted by the emitter 118, reflected by the phase correction cover 114 and received by the receiver 119 all travel essentially the same distance. FIG. 12 shows another ToF camera 120.

The illustrated phase correction cover 114, has a height (together with the cover mount 116) of 53.4 millimeters (mm), a length (together with the cover mount 116) of 144 mm, and a radius of 54 mm. In certain applications, the height (together with the cover mount) can be in a range from 5 mm to 250 mm, the radium can be in a range from 5 mm to 250 mm, and the length (together with the cover mount) can be in a range from 10 mm to 600 mm.

In some applications, a phase correction cover can follow the ellipse equation discussed above ($c^2 = a^2 - b^2$) where 2a is the length of the length of the major axis, 2b is the length of the minor axis, and c is focal length from the center. There may be no upper limit for the ellipse cover size for the calibration to work. In certain applications, a relatively small calibration setup can be desirable where an elliptical cover in accordance with the equation above has a value of a in a range of 10 mm to 500 mm and a value of c in the range of 3 mm to 30 mm, where a is larger than c. With a and c specified, b is defined.

In certain applications, a phase correction cover can be a half-sphere where the diameter of the sphere is in the range from 10 mm to 500 mm.

Variations and Implementations

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In some cases, the teachings of the present disclosure may be encoded into one or more tangible, non-transitory computer-readable mediums having stored thereon executable instructions that, when executed, instruct a programmable device (such as a processor or DSP) to perform methods or functions relate to ToF camera calibration disclosed herein.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of elements. It should be appreciated that the components of the FIGURES and its teachings are readily scalable and can accommodate a large number of components, as well as more complicated/sophisticated arrangements and configurations. Accordingly, the examples provided should not limit the scope or inhibit the broad teachings of the components as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, shoo d be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A; with no B present (and optional y including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "inducing," "carrying," "having," "containing," "involving," "holding," "composed of," and the like are to be understood to be open-ended, i.e., to mean including out not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the c aims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A system for time-of-flight calibration, the system comprising:
   a light source configured to emit a plurality of light signals;
   a reflector configured to reflect at least some of the plurality of light signals, wherein the reflector is an inner surface of a cover; and
   a pixel array configured to receive the at least some of the plurality of light signals reflected by the reflector, wherein the cover is over the light source and the pixel array;
   wherein the at least some of the plurality of light signals travels a total distance including a respective first distance between the light source and the reflector and a respective second distance between the reflector and the pixel array, and wherein the total distance traveled by each of the at least some of the plurality of light signals is substantially equal.

2. The system of claim 1, wherein the reflector contains the plurality of light signals and prevents light signals from straying outside the system.

3. The system of claim 1, wherein the inner surface of the cover has a shape of half of a three-dimensional ellipse.

4. The system of claim 3, wherein the light source and the pixel array are positioned at or near foci of the ellipse.

5. The system of claim 1, wherein the inner surface of the cover has a shape of a half-sphere.

6. The system of claim 1, further comprising a diffuser in a light path from the light source to the pixel array.

7. The system of claim 1, further comprising an imaging lens positioned above the pixel array and a diffuser positioned above the imaging lens.

8. The system of claim 1, further comprising an optical attenuator in a light path from the light source to the pixel array.

9. The system of claim 8, wherein the optical attenuator is stacked with a diffuser.

10. The system of claim 8, wherein the optical attenuator is positioned between the light source and the reflector.

11. The system of claim 1, further comprising a first channel between the light source and the reflector and a second channel between the reflector and the pixel array.

12. The system of claim 11, wherein the first and second channels include side walls that absorb photons from the plurality of light signals.

13. The system of claim 11, further comprising a waveguide to guide the at least some of the plurality of light signals from the light source to the pixel array.

14. The system of claim 1, wherein the total distance traveled by one of the at least some of the plurality of light signals is within 3 millimeters error of the total distance traveled by all other ones of the at least some of the plurality of light signals.

15. A system for time-of-flight calibration, the system comprising:
   a light source configured to emit a plurality of light signals;
   a pixel array configured to receive at least some of the plurality of light signals; and
   a waveguide configured to guide the least some of the plurality of light signals from the light source to the pixel array;
   wherein each of the at least some of the plurality of light signals travels a total distance from the light source to the pixel array, and wherein the total distance traveled by one of the at least some of the plurality of light signals being within 3 millimeters error of the total distance traveled by each of the other ones of the at least some of the plurality of light signals.

16. The system of claim 15, wherein the waveguide is an optical fiber.

17. A method of time-of-flight calibration, the method comprising:
   emitting, from a light source of a time-of-flight module, a plurality of light signals;
   receiving, with a pixel array of the time-of-flight module, at least some of the plurality of light signals, wherein each of the at least some of plurality of light signals travels a substantially equal distance from the light source to the pixel array; and
   determining correction terms for phase delay associated with pixels of the pixel array based on the receiving,
   wherein the at least some of the plurality of light signals travel from the light source and are reflected by a reflector to the pixel array, the reflector being an inner surface of a cover over the light source and the pixel array of the time-of-flight module.

18. The method of claim 17, wherein the cover has a shape of half of a three-dimensional ellipse or a shape of a half-sphere.

19. The method of claim 17, wherein a waveguide guides the at least some of plurality of light signals from the light source to the pixel array.

20. The method of claim 17, further comprising applying the correction terms to calibrate the time-of-flight module.

* * * * *